US012347606B2

(12) United States Patent
Yen et al.

(10) Patent No.: US 12,347,606 B2
(45) Date of Patent: Jul. 1, 2025

(54) INDUCTOR DEVICE

(71) Applicant: Realtek Semiconductor Corporation, Hsinchu (TW)

(72) Inventors: Hsiao-Tsung Yen, Hsinchu (TW); Ting-Yao Huang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 757 days.

(21) Appl. No.: 17/406,259

(22) Filed: Aug. 19, 2021

(65) Prior Publication Data

US 2022/0230801 A1 Jul. 21, 2022

(30) Foreign Application Priority Data

Jan. 15, 2021 (TW) ................................ 110101716

(51) Int. Cl.

*H01F 27/28* (2006.01)
*H01F 27/29* (2006.01)
*H01F 27/40* (2006.01)

(52) U.S. Cl.

CPC ............ *H01F 27/29* (2013.01); *H01F 27/40* (2013.01)

(58) Field of Classification Search

CPC .. H01F 27/29; H01F 27/40; H01F 2017/0073; H01F 17/0006; H01F 27/2804; H01F 2017/0046

See application file for complete search history.

(56) References Cited

U.S. PATENT DOCUMENTS

| | | | | |
|---|---|---|---|---|
| 7,420,452 | B1 * | 9/2008 | Lee | H01F 17/0006 336/200 |
| 7,576,026 | B2 * | 8/2009 | Ghosh | B01J 29/40 502/77 |
| 9,729,121 | B2 * | 8/2017 | Tsai | H01F 27/2804 |
| 10,818,429 | B2 | 10/2020 | Yen et al. | |
| 2011/0032067 | A1 * | 2/2011 | Le Guillou | H01F 27/346 336/200 |
| 2013/0082810 | A1 * | 4/2013 | Feng | H01F 27/2804 336/145 |
| 2015/0065068 | A1 * | 3/2015 | Mattsson | H01F 27/2804 336/200 |
| 2015/0109067 | A1 * | 4/2015 | Park | H01F 19/04 333/17.1 |
| 2015/0364242 | A1 * | 12/2015 | Aboush | H03B 5/1212 336/192 |
| 2016/0343502 | A1 * | 11/2016 | Yen | H01F 21/12 |
| 2018/0261369 | A1 * | 9/2018 | Mattsson | H01F 27/2804 |
| 2020/0259455 | A1 * | 8/2020 | Komijani | H03B 5/1228 |

FOREIGN PATENT DOCUMENTS

| | | | |
|---|---|---|---|
| CN | 105917464 | A | 8/2016 |
| KR | 10-1196842 | * | 11/2012 |
| TW | 201642289 | A | 12/2016 |

* cited by examiner

*Primary Examiner* — Mang Tin Bik Lian

(74) *Attorney, Agent, or Firm* — troutman pepper locke; Tim Tingkang Xia, Esq.

(57) ABSTRACT

An inductor device including a first ring-type structure, a second ring-type structure, and a third ring-type structure is disclosed. The second ring-type structure is coupled to the first ring-type structure and formed an 8-shaped loop with the first ring-type structure. The third ring-type structure is coupled to the second ring-type structure. The first ring-type structure and the second ring-type structure are located at an area surrounded by the third ring-type structure.

15 Claims, 8 Drawing Sheets

INDUCTOR DEVICE

CROSS-REFERENCE TO RELATED APPLICATION

This application claims the priority benefit of TAIWAN Application serial no. 110101716, filed Jan. 15, 2021, the full disclosure of which is incorporated herein by reference.

BACKGROUND

Field of Invention

The invention relates to a device. More particularly, the invention relates to an inductor device.

Description of Related Art

Existing inductors of various types includes their advantages and disadvantages, such as a spiral-type inductor, which has a high Q value and a large mutual inductance. However, the mutual inductance and coupling occur between the coils. On the other hand, for an 8-shaped inductor, since the direction of the induced magnetic field of the two coils is opposite, the coupling and mutual inductance occur in the coupling magnetic field of the other coil. In addition, the 8-shaped inductor occupies a large area in the device.

Therefore, it is desirable to provide an inductor device to provide different inductance values so as to expand the use range of the inductor device while maintaining the quality factor of the inductor.

SUMMARY

An aspect of this disclosure is to provide an inductor device includes a first ring-type structure, a second ring-type structure, and a third ring-type structure. The second ring-type structure is coupled to the first ring-type structure and formed an 8-shaped loop with the first ring-type structure. The third ring-type structure is coupled to the second ring-type structure. The first ring-type structure and the second ring-type structure are located at an area surrounded by the third ring-type structure.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
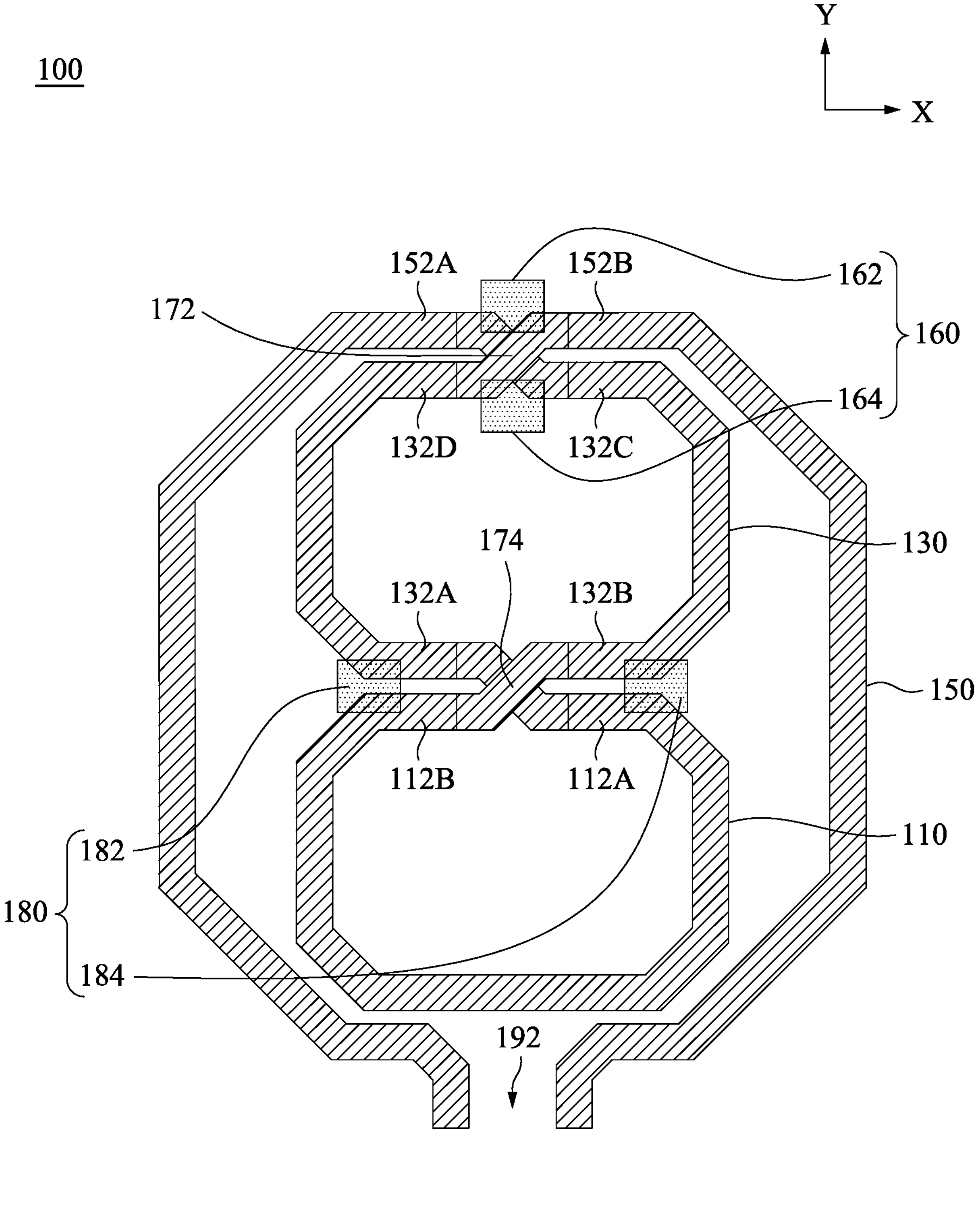
FIG. 1 is a schematic diagram of an inductor device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram of an inductor device 100 according to some embodiments of the present disclosure. The inductor device 100 includes a ring-type structure 110, a ring-type structure 130 and a ring-type structure 150. As illustrated in FIG. 1. Structurally, the ring-type structure 130 is coupled to the ring-type structure 110, and the ring-type structure 150 is coupled to the ring-type structure 130. The ring-type structure 110 and the ring-type structure 130 form an 8-shaped loop. The ring-type structure 110 and the ring-type structure 130 are located at an area surrounded by the ring-type structure 150.

In detail, the terminal 112A of the ring-type structure 110 is connected to the terminal 132A of the ring-type structure 130, the terminal 112B of the ring-type structure 110 is connected to the terminal 132B of the ring-type structure 130, and terminal 132C of the ring-type structure 130 is connected to the terminal 152A of the ring-type structure 150, the terminal 132D of the ring-type structure 130 is connected to the terminal 152B of the ring-type structure 150.

In some embodiments, the inductor device 100 further includes a connector 160. The connector 160 is coupled to the ring-type structure 130 and the ring-type structure 150. In detail, the connector 160 includes a switch 162 and a switch 164. The switch 162 is connected to the terminal 152A of the ring-type structure 150 and the terminal 152B of the ring-type structure 150, and the switch 164 is connected to the terminal 132C of the ring-type structure 130 and the terminal 132D of the ring-type structure 130.

The ring-type structure 130 and the ring-type structure 150 are staggered at the staggered point 172. The switch 162 is disposed at a side of the staggered point 172, for example, the upper side in the figure, and the switch 164 is disposed at another side of the staggered point 172, for example, the bottom side in the figure.

In some embodiments, the inductor device 100 further includes a connector 180. The connector 180 is coupled to the ring-type structure 110 and the ring-type structure 130. In detail, the connector 180 includes a switch 182 and a switch 184. The switch 182 is connected to the terminal 132A of the ring-type structure 130 and the terminal 112B of the ring-type structure 110, and the switch 184 is connected to the terminal 132B of the ring-type structure 130 and the terminal 112A of the ring-type structure 110.

The ring-type structure 110 and the ring-type structure 130 are staggered at the staggered point 174. The switch 182 is disposed at a side of the staggered point 174, for example, the left side in the figure, and the switch 184 is disposed at another side of the staggered point 174, for example, the right side in the figure.

In some embodiments, as illustrated in FIG. 1, the connector 160 is disposed in the Y direction, and the connector 180 is disposed in the X direction. The X direction and the Y direction are perpendicular to each other. Furthermore, the ring-type structure 150 further includes an opening 192. The opening 192 is disposed in the Y direction. The ring-type structure 110 and the ring-type structure 130 are disposed in the Y direction.

The connector 160 is configured to selectively connect to the ring-type structure 130 and the ring-type structure 150. The connector 180 is configured to selectively connect to the ring-type structure 110 and the ring-type structure 130.

The following will describe the different conduction status of the connector 160 and the connector 180.

Figure 2:
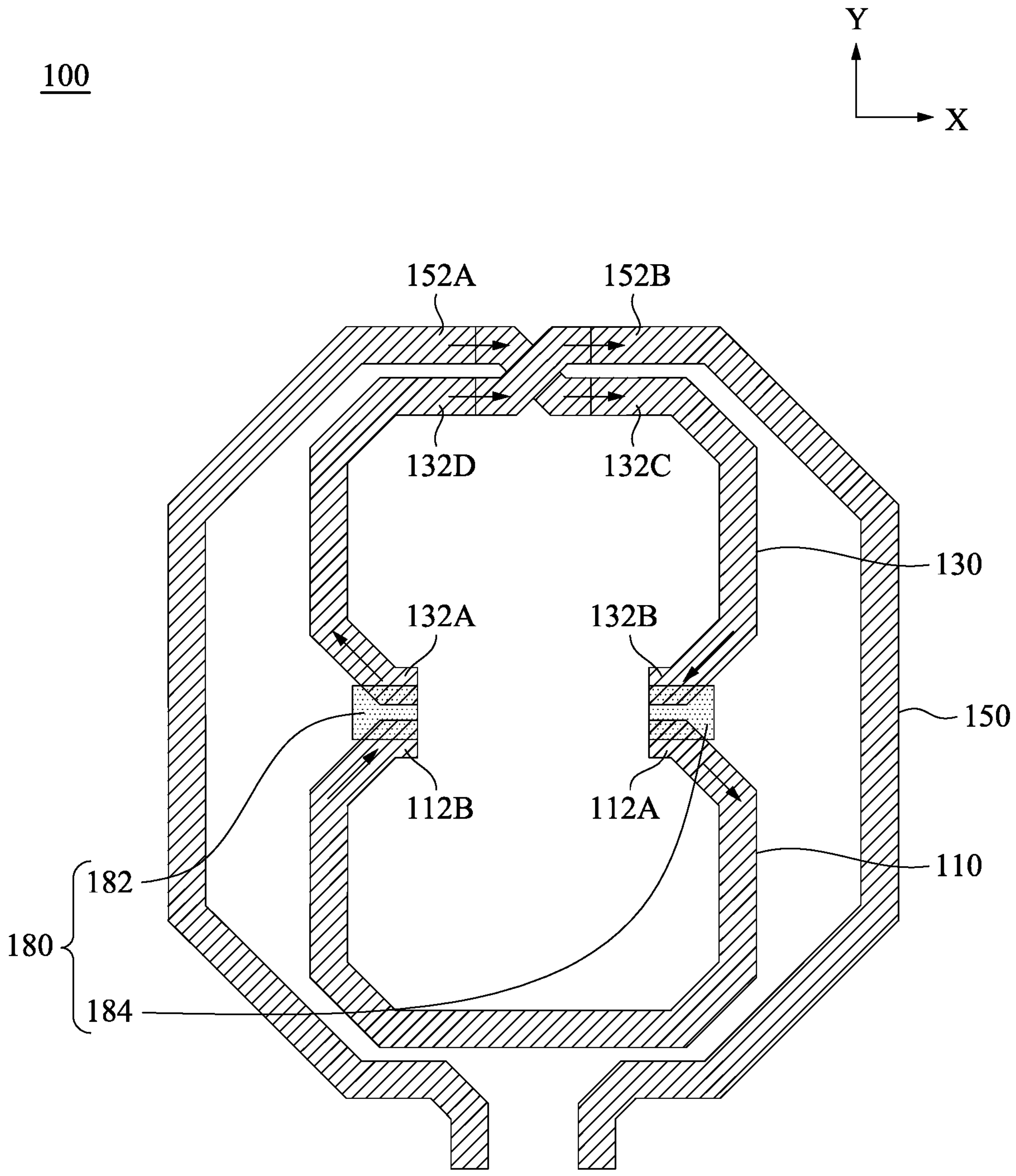
FIG. 2 is a schematic diagram of the operation of the inductor device in FIG. 1 according to some embodiments of the present disclosure.

Reference is made to FIG. 2. FIG. 2 is a schematic diagram of the operation of the inductor device 100 in FIG. 1 according to some embodiments of the present disclosure. As illustrated in FIG. 2, when the connector 160 in FIG. 1 is not conducted and the connector 180 is conducted, the ring-type structure 110, the ring-type structure 130 and the ring-type structure 150 form a loop together. At this time, the ring-type structure 150 is a ring-shaped loop, and the ring-type structure 110 and the ring-type structure 130 also form a ring-shaped loop.

For example, in some embodiments, the current flows from the terminal 152A of the ring-type structure 150 to the terminal 132C of the ring-type structure 130, from the terminal 132B of the ring-type structure 130 through the switch 184 to the terminal 112A of the ring-type structure 110, from the terminal 112B of the ring-type structure 110 through the switch 182 to the terminal 132A of the ring-type structure 130, and from the terminal 132D of the ring-type structure 130 to the terminal 152B of the ring-type structure 150. The current directions mentioning above are for illustrative purposes only.

Figure 3:
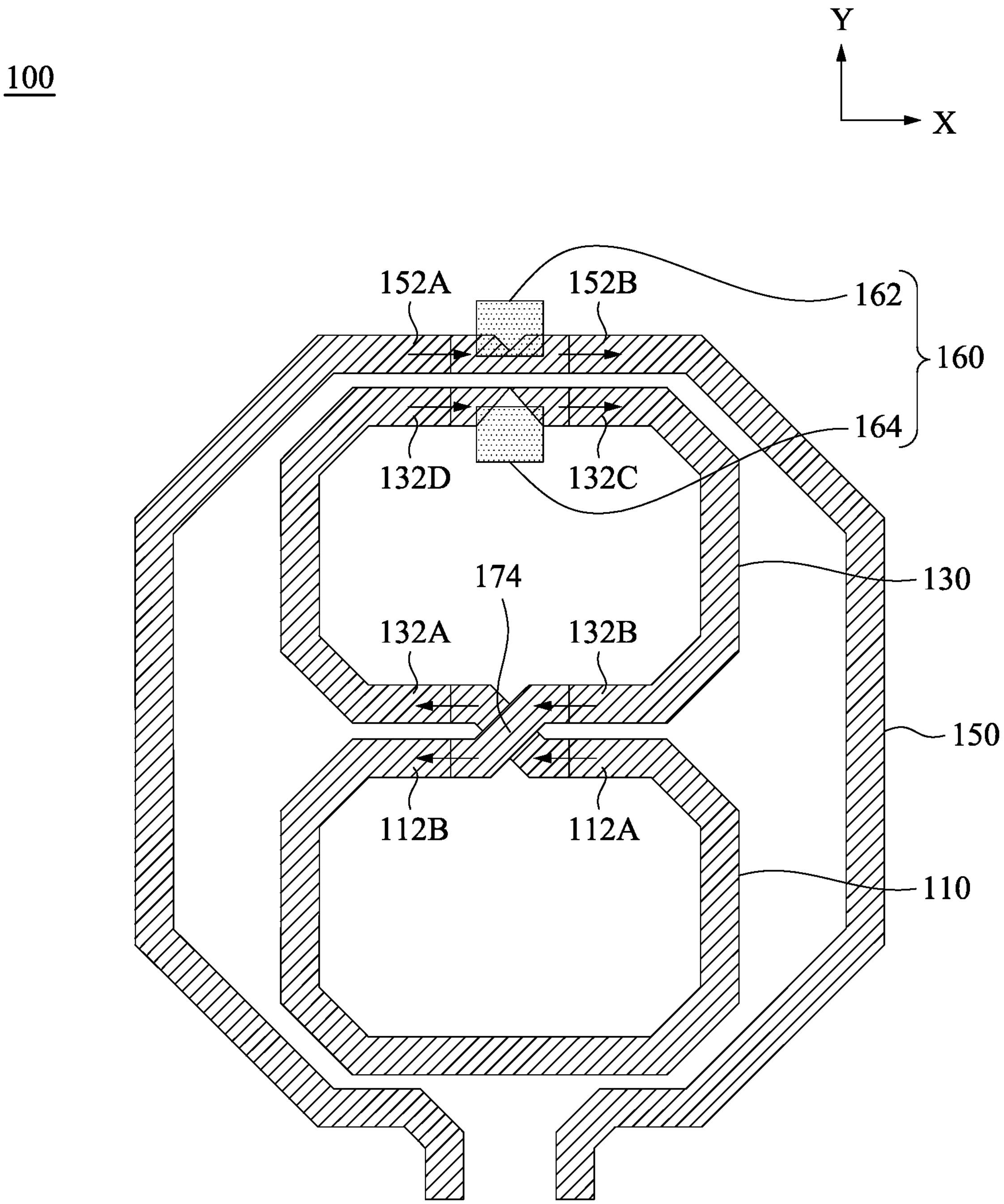
FIG. 3 is a schematic diagram of the operation of the inductor device in FIG. 1 according to some embodiments of the present disclosure.

Reference is made to FIG. 3. FIG. 3 is a schematic diagram of the operation of the inductor device 100 in FIG. 1 according to some embodiments of the present disclosure. As illustrated in FIG. 3, when the connector 160 in FIG. 1 is conducted and the connector 180 is not conducted, the ring-type structure 110 and the ring-type structure 130 form a loop together, and the ring-type structure 150 forms another loop. The loop formed by the ring-type structure 110 and the ring-type structure 130 together mentioning above is the 8-shaped loop.

For example, in some embodiments, the current flows from the terminal 152A of the ring-type structure 150 through the switch 162 to the terminal 152B of the ring-type structure 150. Furthermore, the current flows from the terminal 132D of the ring-type structure 130 through the switch 164 to the terminal 132C of the ring-type structure 130, from the terminal 132C of the ring-type structure 130 to the terminal 132B of the ring-type structure 130, from the terminal 132B of the ring-type structure 130 to the terminal 112B of the ring-type structure 110, from the terminal 112B of the ring-type structure 110 to the terminal 112A of the ring-type structure 110, from the terminal 112A of the ring-type structure 110 to the terminal 132A of the ring-type structure 130, and then from the terminal 132A of the ring-type structure 130 to the terminal 132D of the ring-type structure 130. The current directions mentioning above are for illustrative purposes only.

Figure 4:
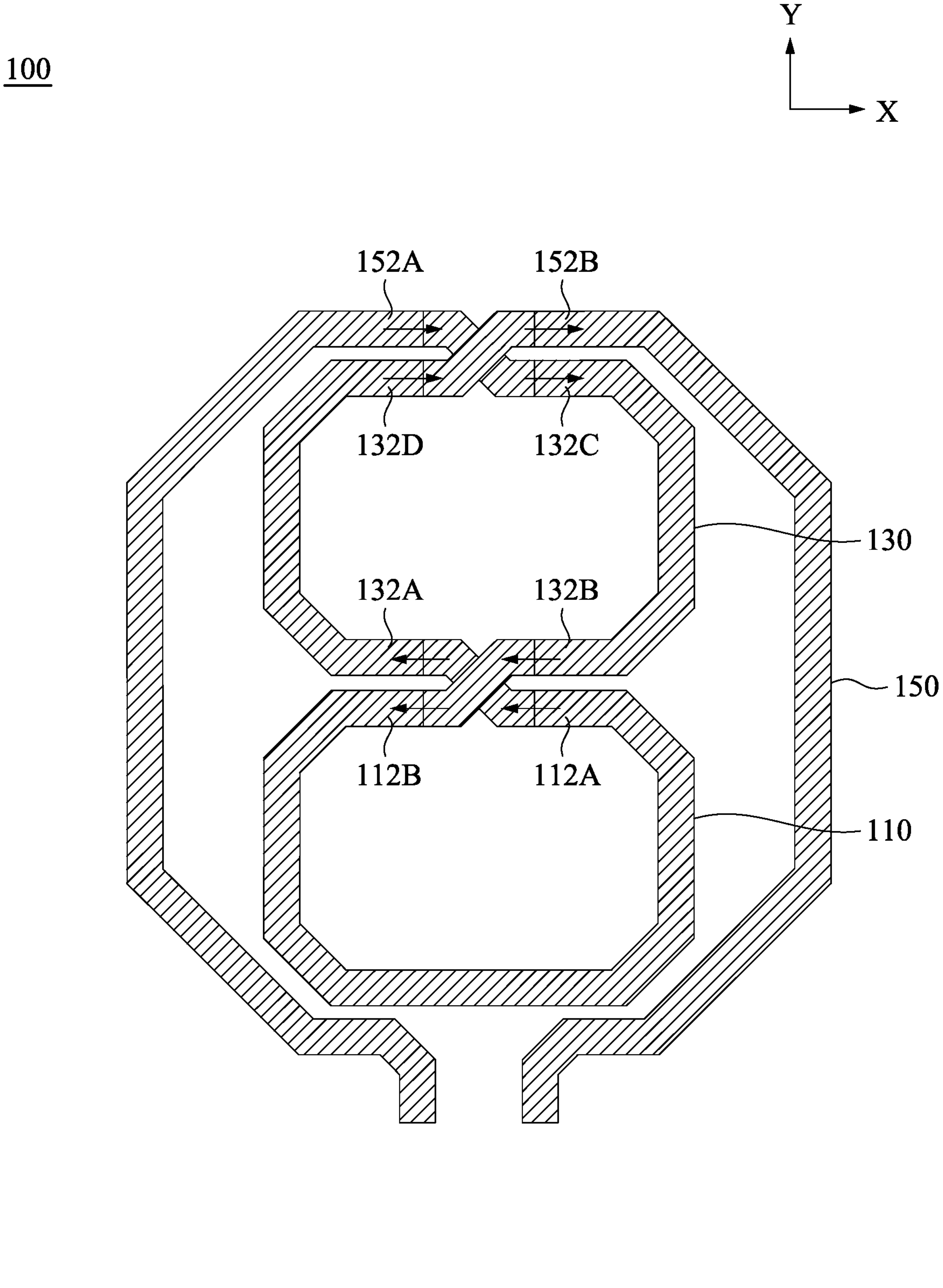
FIG. 4 is a schematic diagram of the operation of the inductor device in FIG. 1 according to some embodiments of the present disclosure.

Reference is made to FIG. 4. FIG. 4 is a schematic diagram of the operation of the inductor device 100 in FIG. 1 according to some embodiments of the present disclosure. As illustrated in FIG. 4, when both of the connector 160 and the connector 180 in FIG. 1 are not conducted, the ring-type structure 110, the ring-type structure 130 and the ring-type structure 150 form a loop together, and the ring-type structure 110 and the ring-type structure 130 form an 8-shaped loop together.

For example, in some embodiments, the current flows from the terminal 152A of the ring-type structure 150 to the terminal 132C of the ring-type structure 130, from the terminal 132C of the ring-type structure 130 to the terminal 132B of the ring-type structure 130, from the terminal 132B of the ring-type structure 130 to the terminal 112B of the ring-type structure 110, from the terminal 112B of the ring-type structure 110 to the terminal 112A of the ring-type structure 110, from the terminal 112A of the ring-type structure 110 to the terminal 132A of the ring-type structure 130, from the terminal 132A of the ring-type structure 130 to the terminal 132D of the ring-type structure 130, and then from the terminal 132D of the ring-type structure 130 to the terminal 152B of the ring-type structure 150. The current directions as mentioning above are for illustrative purposes only.

As illustrated in FIG. 2 to FIG. 4, by controlling the conduction of the connector 160 and the connector 180 in FIG. 1, the inductance value of the inductor device 100 can be changed to expand the range of usage of the inductor device 100. Furthermore, when the ring-type structure 110 and the ring-type structure 130 form an 8-shaped inductor, the coupling effect formed by the ring-type structure 110 and the ring-type structure 130 will cancel each other and reduce the interference caused by the coupling effect.

Figure 5:
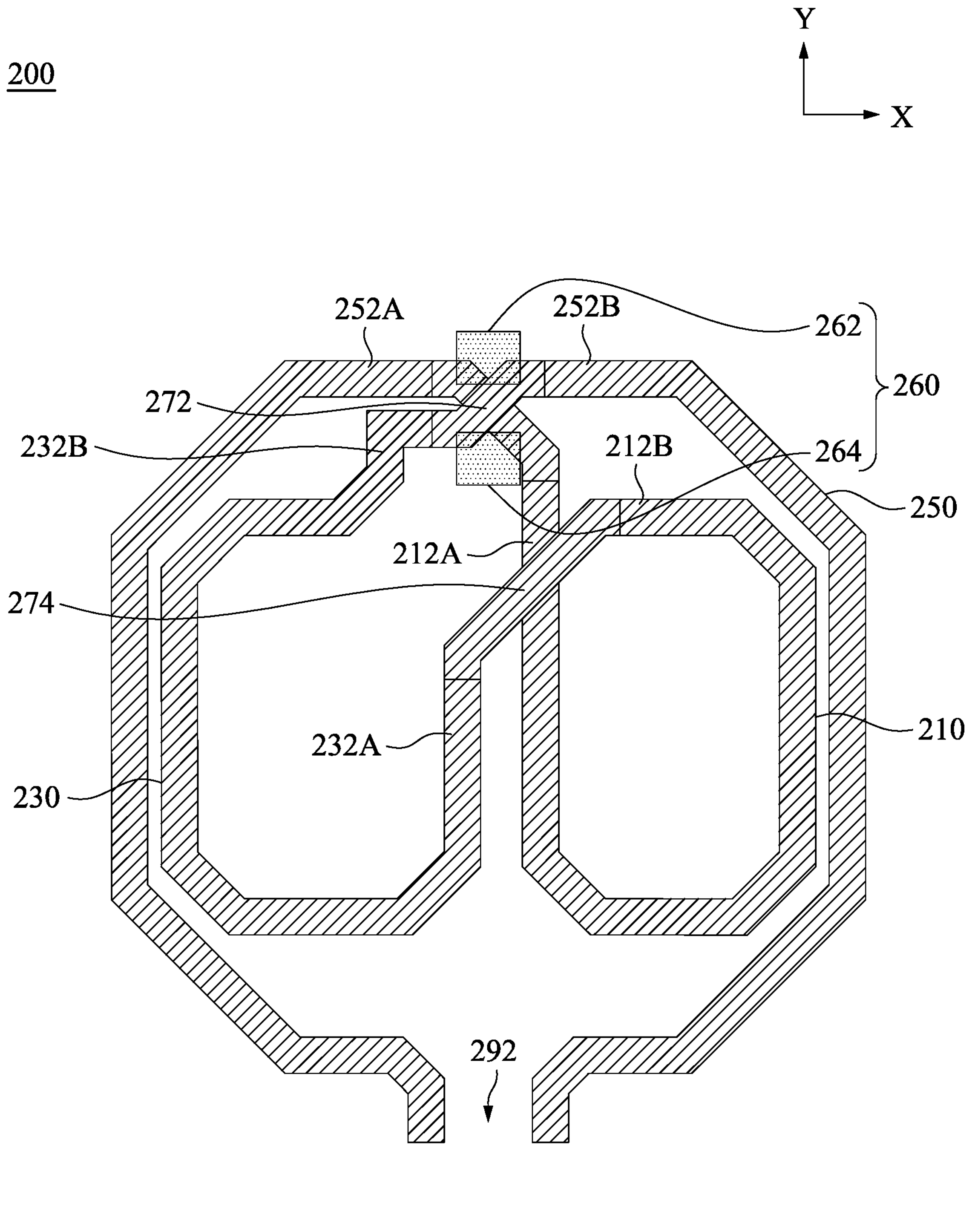
FIG. 5 is a schematic diagram of an inductor device according to some embodiments of the present disclosure.

Reference is made to FIG. 5. FIG. 5 is a schematic diagram of an inductor device 200 according to some embodiments of the present disclosure. The inductor device 200 includes a ring-type structure 210, a ring-type structure 230 and a ring-type structure 250. As illustrated in FIG. 5. Structurally, the ring-type structure 210, the ring-type structure 230 and the ring-type structure 250 coupled to each other. The ring-type structure 210 and the ring-type structure 230 from an 8-shaped loop. The ring-type structure 210 and the ring-type structure 230 are located in the area surrounded by the ring-type structure 250.

In detail, the terminal 252A of the ring-type structure 250 is connected to the terminal 212A of the ring-type structure 210, the terminal 212B of the ring-type structure 210 is connected to the terminal 232A of the ring-type structure 230, and the terminal 232B of the ring-type structure 230 is connected to the terminal 252B of the ring-type structure 250.

In some embodiments, the inductor device 200 further includes the connector 260. The connector 260 couples to the ring-type structure 210 and the ring-type structure 230 and the ring-type structure 250. In detail, the connector 260 includes the switch 262 and the switch 264. The switch 262 is connected to the terminal 252A of the ring-type structure 250 and the terminal 252B of the ring-type structure 250, and the switch 264 is connected to the terminal 232B of the ring-type structure 230 and the terminal 212A of the ring-type structure 210.

The ring-type structure 210, the ring-type structure 230 and the ring-type structure 250 are staggered at the staggered point 272 and the staggered point 274. The switch 262 is disposed at one side of the staggered point 272, for example, the upper side in the figure, and the switch 264 is disposed at another side of the staggered point 272, for example, the bottom side in the figure.

In some embodiments, the switch 262 is connected to the terminal 252A of the ring-type structure 250 and the terminal 252E of the ring-type structure 250, and the switch 264 is connected to the terminal 232B of the ring-type structure 230 and the terminal 212A of the ring-type structure 210.

In some embodiments, the ring-type structure 250 further includes an opening 292. The opening 292 is disposed in the Y direction. Furthermore, the ring-type structure 210 and the ring-type structure 230 are disposed in the X direction. The X direction and the Y direction are perpendicular to each other.

Figure 6:
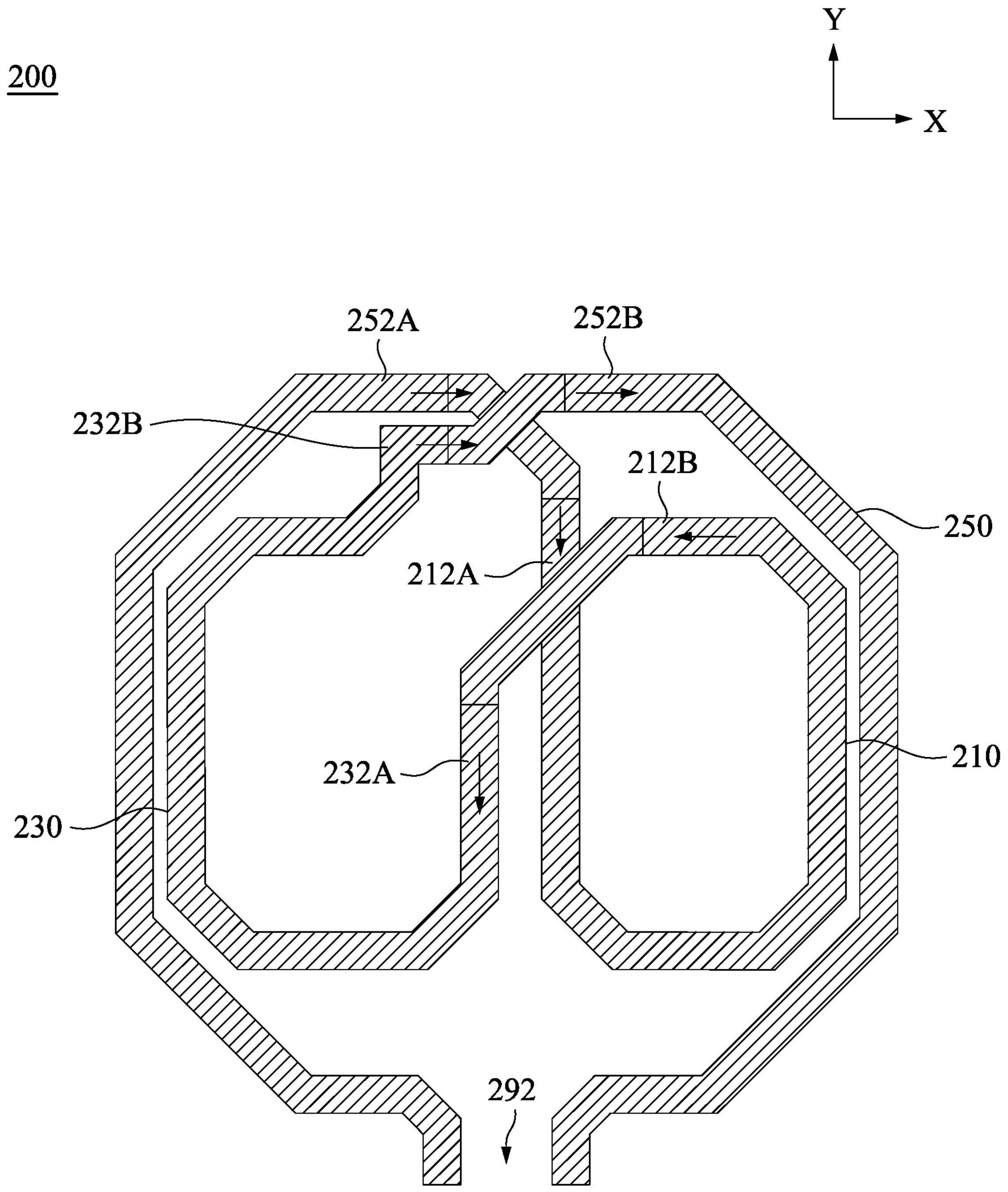
FIG. 6 is a schematic diagram of the operation of the inductor device in FIG. 5 according to some embodiments of the present disclosure.

Reference is made to FIG. 6. FIG. 6 is a schematic diagram of the operation of the inductor device 200 in FIG. 5 according to some embodiments of the present disclosure. As illustrated in FIG. 6, when the connector 260 in FIG. 6 is not conducted, the ring-type structure 210, the ring-type structure 230 and the ring-type structure 250 form a loop together.

For example, in some embodiments, the current flows from the terminal 252A of the ring-type structure 250 to the terminal 212A of the ring-type structure 210, from the terminal 212A of the ring-type structure 210 to the terminal 232A of the ring-type structure 230, from the terminal 232A of the ring-type structure 230 to the terminal 232B of the ring-type structure 230, from the terminal 232B of the ring-type structure 230 to the terminal 252B of the ring-type structure 250. The current directions as mentioning above are for illustrative purposes only.

Figure 7:
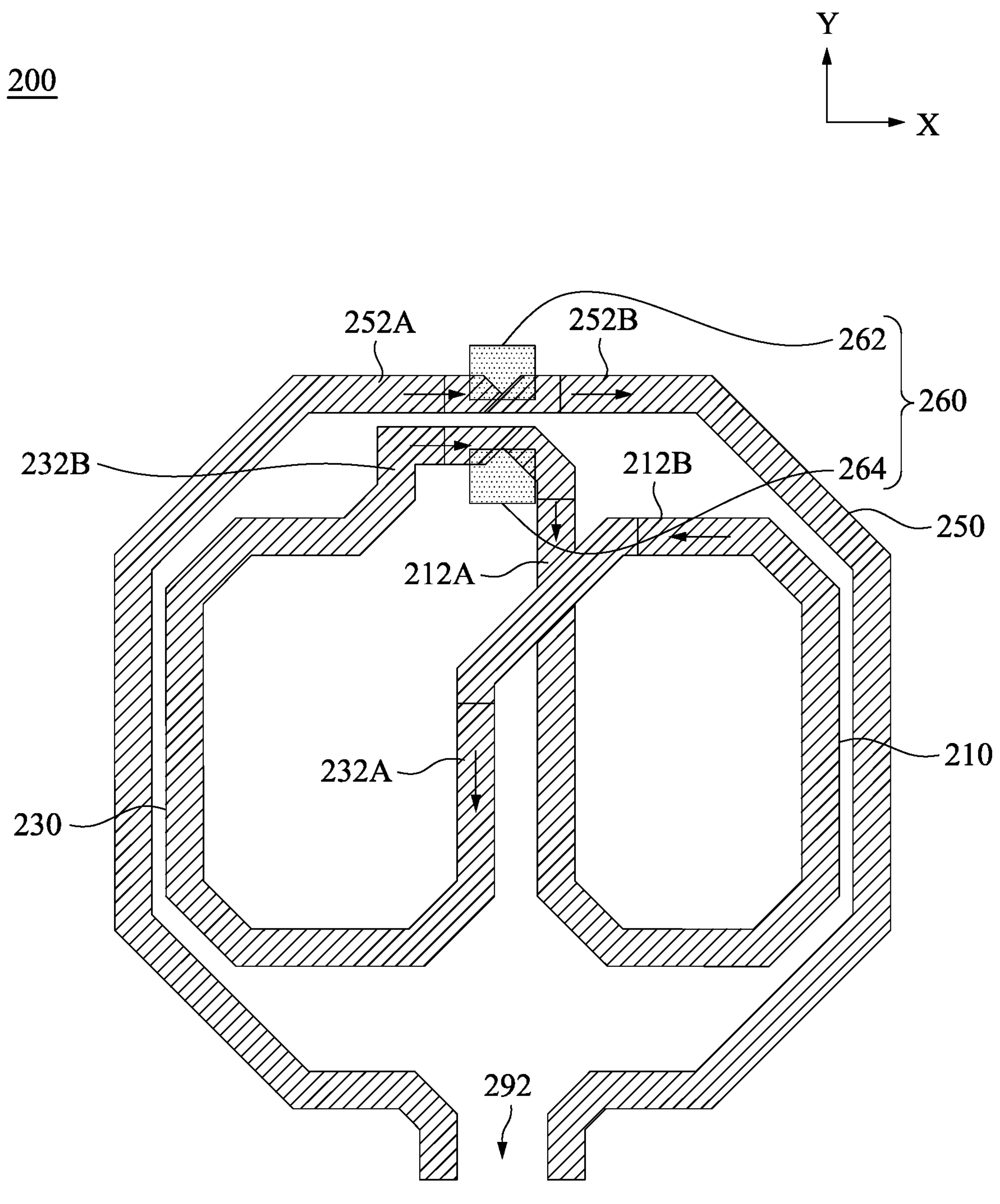
FIG. 7 is a schematic diagram of the operation of the inductor device in FIG. 5 according to some embodiments of the present disclosure.

Reference is made to FIG. 7. FIG. 7 is a schematic diagram of the operation of the inductor device 200 in FIG. 5 according to some embodiments of the present disclosure. As illustrated in FIG. 7, when the connector 260 in FIG. 7 is conducted, the ring-type structure 210 and the ring-type structure 230 forms an 8-shaped loop together. The ring-type structure 250 forms another loop.

For example, in some embodiments, the current flows from the terminal 252A of the ring-type structure 250 through the switch 262 to the terminal 252B of the ring-type structure 250. On the other hand, the current flows from the terminal 232B of the ring-type structure 230 through the switch 264 to the terminal 212A of the ring-type structure 210, from the terminal 212A of the ring-type structure 210 to the terminal 212B of the ring-type structure 210, form the terminal 212B of the ring-type structure 210 to the terminal 232A of the ring-type structure 230, and then from the terminal 232A of the ring-type structure 230 to the terminal 232B of the ring-type structure 230. The current directions as mentioning above are for illustrative purposes only.

Figure 8:
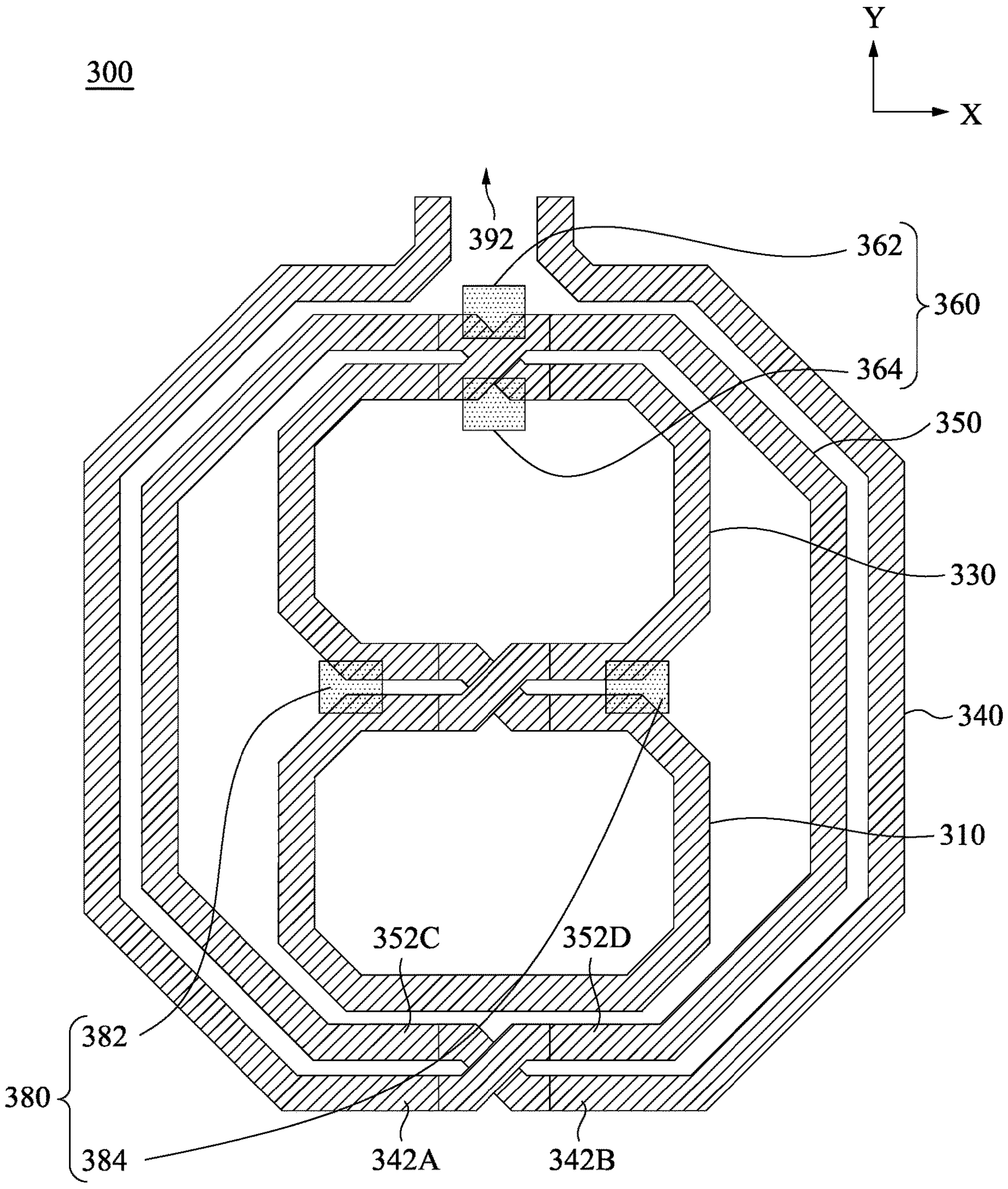
FIG. 8 is a schematic diagram of an inductor device according to some embodiments of the present disclosure.

Reference is made to FIG. 8. FIG. 8 is a schematic diagram of an inductor device 300 according to some embodiments of the present disclosure. The difference between the inductor device 300 in FIG. 8 and the inductor device 100 in FIG. 1 is that the inductor device 300 further includes a ring-type structure 340.

In detail, the inductor device 300 includes the ring-type structure 310, the ring-type structure 330, the ring-type structure 350 and the ring-type structure 340. The ring-type structure 310 and the ring-type structure 330 are coupled to each other, the ring-type structure 330 and the ring-type structure 350 are coupled to each other, and the ring-type structure 350 and ring-type structure 340 are coupled to each other. Furthermore, the inductor device 300 further includes the connector 360 and the connector 380. The connector 360 includes the switch 362 and the switch 364. The connector 380 includes the switch 382 and the switch 384.

The above-mentioned connection method of the ring-type structure 310, the ring-type structure 330, the ring-type structure 350, the connector 360 and the connector 380 is the same as that of the ring-type structure 110, the ring-type structure 130, the ring-type structure 150, the connector 160 and the connector 180 in FIG. 1, and will not be described in detail here.

Reference is made to FIG. 8. All of the ring-type structure 310, the ring-type structure 330, and the ring-type structure 350 are located in the area surrounded by the ring-type structure 340.

In detail, the terminal 352C of the ring-type structure 350 is connected to the terminal 342B of the ring-type structure 340, and the terminal 352D of the ring-type structure 350 is connected to the terminal 342A of the ring-type structure 340. Furthermore, the ring-type structure 350 further includes an opening 392, and the opening 392 is disposed in the Y direction.

It should be noted that, in some embodiments, the ring-type structure 340 may be further connected to another ring-type structure (not shown in the figure), that is, the number of the ring-type structures surrounding the ring-type structure 310 and the ring-type structure 330 is not limited by FIG. 8. Furthermore, the inductor device 200 as shown in FIG. 5 may also be connected to more ring-type structures, that is to say, the number of the ring-type structures surrounding the ring-type structure 210 and the ring-type structure 230 is not limited by FIG. 5.

In some embodiments, the location of the opening 192, the opening 292, and the opening 392 are not limited as shown in FIG. 1, FIG. 5 and FIG. 8, those skilled in the art can configure the location of the opening according to actual needs.

In the embodiments of the present disclosure, all of the ring-type structures can be octagonal structures, however, the embodiments of the present disclosure are not limited thereto. The ring-type structure can also be realized by selectively using other polygonal structures, such as quadrangular structures, hexagonal structures, etc.

It should be noted that, the connector 160 and the connector 180 in FIG. 1 can belong to the same connection device and can be controlled together, or both can be a single connection device and can be controlled separately, depending on the actual needs.

According to the embodiment of the present disclosure, it is understood that the embodiment of the present disclosure is to provide an inductor device. The inductor device can be turned into an 8-shaped inductor or a toroidal inductor through the operation of the connector. Since the inductor device has different inductance values when used as an 8-shaped inductor or a toroidal inductor, different inductance values can be provided to expand the application range of the inductor device. In addition, when the ring-type structure forms a floating 8-shaped inductor, the coupling effect formed by the ring type structure of the 8-shaped inductor will cancel each other to reduce the interference caused by the coupling effect.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed, and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inductor device, comprising:

a first ring-type structure;

a second ring-type structure, coupled to the first ring-type structure and formed an 8-shaped loop with the first ring-type structure;

a third ring-type structure, coupled to the second ring-type structure, wherein the first ring-type structure and the second ring-type structure are located at an area surrounded by the third ring-type structure; and a first connector, coupled to the second ring-type structure and the third ring-type structure, wherein the first connector includes a first mode and a second mode, wherein in response to that the first connector is conducted, a first current flows from a first terminal of the third ring-type structure directly to a second terminal of the third ring-type structure, and a second current flows from a first terminal of the second ring-type structure directly to a second terminal of the second ring-type structure, wherein in response to that the first connector is not conducted, the first current flows from the first terminal of the third ring-type structure to the first terminal of the second ring-type structure, and flows from the second terminal of the second ring-type structure to the second terminal of the third ring structure.

2. The inductor device of claim 1 wherein in response to that the first connector is conducted, the first ring-type structure and the second ring-type structure form a first loop, and the third ring-type structure forms a second loop.

3. The inductor device of claim 1, wherein the first connector comprises:

a first switch, connected to the first terminal of the third ring-type structure and the second terminal of the third ring-type structure; and a second switch, connected to the first terminal of the second ring-type structure and the second terminal of the second ring-type structure.

4. The inductor device of claim 3, wherein the second ring-type structure and the third ring-type structure are staggered at a staggered point, wherein the first switch is disposed at a first side of the staggered point, and the second switch is disposed at a second side of the staggered point.

5. The inductor device of claim 2, further comprising:

a second connector, coupled to the first ring-type structure and the second ring-type structure, and is configured to selectively connect to the first ring-type structure and the second ring-type structure.

6. The inductor device of claim 5, wherein the second connector comprises:

a first switch, connected to a first terminal of the first ring-type structure and a third terminal of the second ring-type structure; and a second switch, connected to a second terminal of the first ring-type structure and a fourth terminal of the second ring-type structure.

7. The inductor device of claim 6, wherein the first ring-type structure and the second ring-type structure are staggered at a staggered point, wherein the first switch is disposed at a first side of the staggered point, and the second switch is disposed at a second side of the staggered point.

8. The inductor device of claim 5, wherein when both of the first connector and the second connector are not conducted, the first ring-type structure, the second ring-type structure and the third ring-type structure form a loop together.

9. The inductor device of claim 5, wherein when the first connector is connected and the second connector is not connected, the first ring-type structure and the second ring-type structure form the first loop, and the third ring-type structure forms the second loop, wherein the first loop is the 8-shaped loop.

10. The inductor device of claim 5, wherein when the first connector is not conducted and the second connector is conducted, the first ring-type structure, the second ring-type structure and the third ring-type structure form a loop together, wherein the first ring-type structure and the second ring-type structure form a ring-shaped loop.

11. The inductor device of claim 5, wherein the first connector is disposed in a first direction and the second connector is disposed in a second direction, and the first direction and the second direction are perpendicular to each other.

12. The inductor device of claim 1, wherein the third ring-type structure comprises:

an opening, disposed in a first direction, wherein the first ring-type structure and the second ring-type structure are disposed in the first direction.

13. The inductor device of claim 1, wherein a first terminal of the first ring-type structure is connected to a third terminal of the second ring-type structure, a second terminal of the first ring-type structure is connected to a fourth terminal of the second ring-type structure, the first terminal of the second ring-type structure is connected to the first terminal of the third ring-type structure, and the second terminal of the second ring-type structure is connected to the second terminal of the third ring-type structure.

14. The inductor device of claim 1, further comprising:

a fourth ring-type structure, coupled to the third ring-type structure, wherein all of the first ring-type structure, the second ring-type structure and the third ring-type structure are located at an area surrounded by the fourth ring-type structure.

15. The inductor device of claim 14, wherein a first terminal of the fourth ring-type structure is connected to the first terminal of the third ring-type structure and a second terminal of the fourth ring-type structure is connected to the second terminal of the third ring-type structure.

* * * * *